Figure 1:
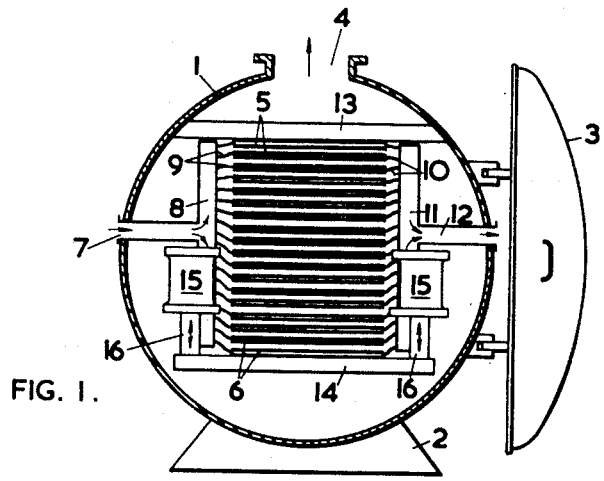

James McNair Dalgleish
Hugh Percy Thompson
Inventors
By Cushman, Darby, Cushman
Attorneys

United States Patent Office 3,118,742
Patented Jan. 21, 1964

3,118,742
VACUUM FOOD PRESS DRIER
James McNair Dalgleish and Hugh Percy Thompson, Aberdeen, Scotland, assignors, by mesne assignments, to National Research Development Corporation, London, England
Filed Aug. 18, 1959, Ser. No. 834,593
Claims priority, application Great Britain Aug. 22, 1958
3 Claims. (Cl. 34—92)

This invention relates to the dehydration of foodstuffs between heated plates and more particularly, but not exclusively, to what is known as the accelerated freeze-drying process.

The process of dehydration has long been used as a means of preserving food, but it is in more recent times that the particular process of freeze-drying has become evident as the most attractive drying method for carrying out such dehydration of foodstuffs since it produces least damage to the flavour, texture, nutritive value and appearance of the food. Also, dehydration of foodstuffs by the freeze-drying process permits long storage life of the product (with the economic advantages of reduced weight and sometimes of reduced bulk) without refrigeration; permits the drying of either raw or pre-cooked foods, in large recognisable pieces (e.g., slices, filets or steaks); confers the quality of very rapid reconstitution, on the addition of water, to a product closely resembling the original.

In such known freeze-drying process as used hitherto, the foodstuffs to be preserved are firstly frozen, after which they are subjected to heat treatment for the removal of water vapour therefrom by sublimation from the ice surface in the frozen material. This removal of moisture content is usually done by loading the foodstuffs on to flat metal trays and then sandwiching the trays between horizontal hollow metal plates heated by some medium, such as hot water, circulated therethrough, within a vacuum-tight metal drying cabinet maintained at a suitable low internal pressure by means of a pumping system, each tray before insertion in the cabinet being covered with a flat metal sheet or lid so that contamination of the foodstuffs by the heating plates is prevented.

In order that the process shall operate economically, the latent heat of sublimation has to be supplied at a rate sufficient to ensure that drying is completed in a reasonably short time. With this end in view, during drying of the foodstuffs the heated plates are adpated to be moved closer together, and continuous plate pressure may be applied so that close thermal contact with the foodstuffs is maintained.

Whilst these measures ensure an ample supply of heat to the foodstuffs, at the same time they have an adverse effect on the removal of water vapor from them. Under ideal conditions, molecules of vapour leaving the surfaces of the foodstuffs should be able to escape as freely as possible within the vacuum cabinet and from thence to a condensing system. In practice, since the flat heating and foodstuff surfaces are in contact with one another, mechanical impedance to vapour flow or "stifling" is present to an extent dependent upon the degree of contact. If the plates are only in light contact with the foodstuffs, "stifling" is slight, but the rate of transfer of heat is low. Moderate contact increases the rate of heat transfer, but "stifling" affects the rate of drying by causing a local increase in vapour pressure at the surface of the foodstuffs. If thermal contact is close enough to cause heavy "stifling," sublimation ceases, the ice temperature rises and thawing occurs, which latter has the effect of producing an inferior product.

It will be appreciated therefore, that since heat transfer and "stifling" are mutually opposed, successful freeze-drying by the above method depends upon a suitable compromise between the two, which means that in order to reduce thawing, low heating water temperatures for the heating plates as well as restrictions in the latter's thermal contact have to be employed for a period at the start of drying. This makes such method uncertain and inefficient with the result that there is always a risk that a proportion of the foodstuffs is only partly freeze-dried, and the product is non-uniform.

In order to overcome the above disadvantages it is obviously necessary to obtain good thermal contact between the heating plates and the foodstuffs, whilst at the same time reducing "stifling" of the water vapour to a minimum, and since heat in applied to and vapour removed from the same surface, it is evident that this requirement cannot be fully met when there is overall contact between the foodstuffs and the heating plates and any degree of pressure is applied. A satisfactory arrangement can be obtained however, by heating in such a way that good thermal contact is obtained over a distributed proportion of the surface of the foodstuffs while the rest of said surface is left virtually open to the interior of the vacuum cabinet.

Freeze-drying has, therefore, so far not become a normal method of food processing because hitherto, in view of the above disadvantages, it has been such a slow and expensive process as to render it unsuitable for general use in the dehydration of foodstuffs and to limit its application mostly to the treatment of expensive biological materials such as pharmaceuticals and the like.

The object of the invention is to provide a method of and apparatus for dehydrating foodstuffs, which have the effect of speeding-up the drying operation of the foodstuffs and thus increasing the output of treated products, and which method and apparatus are particularly suitable for freeze-drying in that they avoid the disavantages mentioned above, by producing an accelerated freeze-drying the speed and throughput of which render it economically feasible as a means of food preservation.

In accordance with the invention, a method of preserving food consists in subjecting the foodstuffs under reduced pressure, to heat imparted thereto through or from elements having point or small area contacts with and spread over the surface or surfaces of the foodstuffs, thereby to cause dehydration of the latter by permitting the ready withdrawal of the water vapour given off by said foodstuffs whilst at the same time allowing sufficient thermal contact between the foodstuffs, and the elements to allow of adequate transfer of heat.

This may be done simply and cheaply according to the invention by providing immediately adjacent the foodstuffs on one or each side thereof, a metal layer of open mesh or network form which on one side is in direct contact with the foodstuffs and through or from which the heat is applied to the latter.

The said metal layers may be either interposed between the foodstuffs and the already existing heating surfaces, or they may themselves conveniently constitute electric heating elements thereby avoiding the necessity for the said heating surfaces, and for the trays and lids, the foodstuffs being supported between pairs of expanded metal layers arranged one upon the other in sandwich form.

The accompanying drawings illustrate, by way of example, an apparatus suitable for carrying out the method of this invention but it will be understood that the construction of such apparatus can be varied in many ways without departing from the scope of the said invention.

Figure 2:
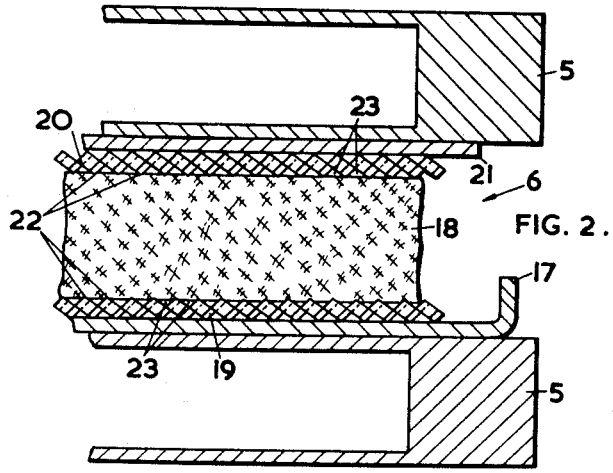
Figure 3:
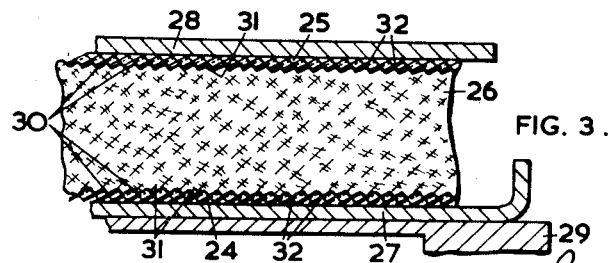
Figure 4:
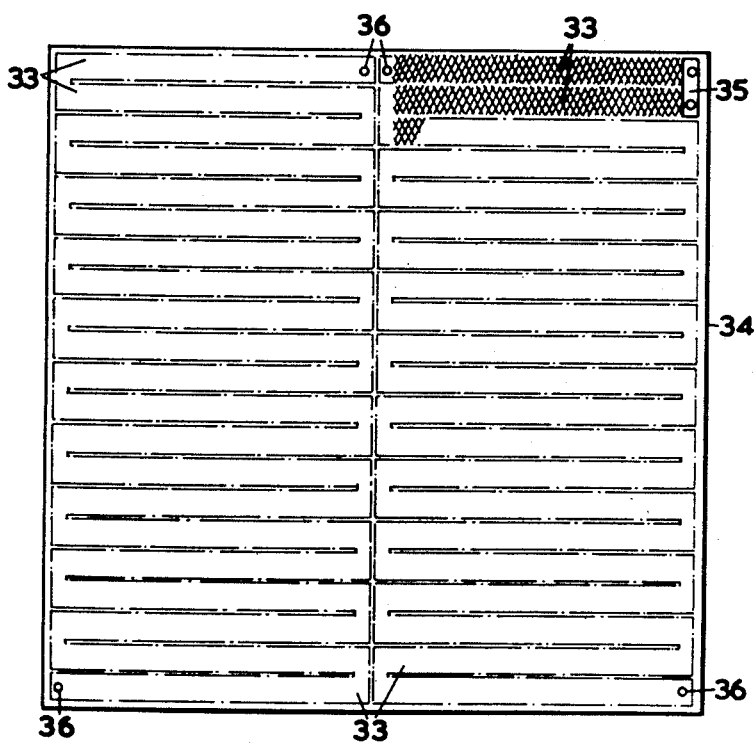
Figure 5:
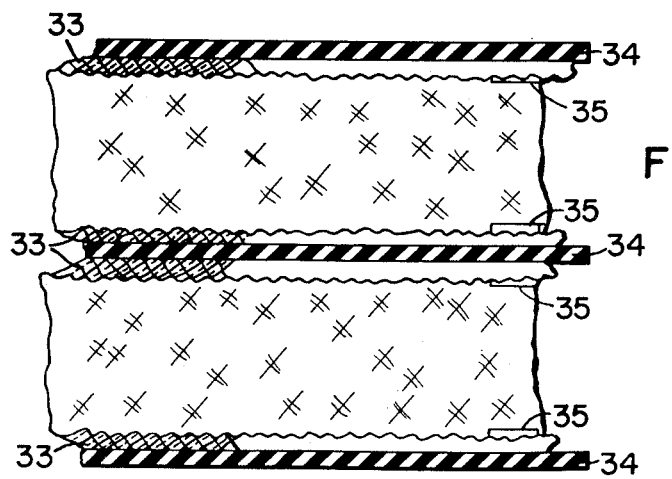

In these drawings:

FIGURE 1 shows in diagrammatic section a drying apparatus equipped for drying by heating in a vacuum and with the aid of mechanical pressure, the trays for holding the foodstuffs having been removed, FIGURE 2 is a diagrammatic section, shown to a larger scale, of part of one pair of heating plates shown in FIGURE 1, with a loaded tray inserted therebetween, FIGURE 3 is a view similar to FIGURE 2 of an alternative arrangement of tray assembly, and FIGURE 4 is a diagrammatic plan view of a modified form of heating plate, FIGURE 5 is a diagrammatic vertical sectional view of a stack of the heating plates of FIGURE 4.

Referring to FIGURE 1, a vacuum tight drying chamber or cabinet 1, which may be of circular or any other convenient cross section, is mounted upon a support 2 and can be opened to the exterior for access thereto or closed to the exterior by means of a vacuum tight door 3 hinged to one side of the chamber the interior of which is in communication, through an exhaust port 4, with a vapour extraction apparatus (not shown).

Within the chamber 1 are mounted, one above the other, a series of horizontally disposed hollow metal heating plates 5 which are disposed at a distance apart from each other as to provide spaces 6 therebetween for the reception of trayloads of foodstuffs to be processed. The plates 5 may be heated by hot water or steam which is delivered through inlet pipe 7 and passes by way of inlet manifold 8 and flexible connecting tubes 9 to the interior of the said plates which may be labyrinthed, and after flowing therethrough, leaves the plates by way of flexible connecting tubes 10, outlet manifold 11 and discharge pipe 12.

The heating plates 5 are suspended between a fixed horizontal upper abutment plate 13 secured to the inner walls of the chamber 1 and a horizontal bottom plate 14 which is adapted to be moved up and down by means of a pair of double-acting pressure fluid operated pistons slidably mounted in cylinders 15 attached to the inner walls of the chamber at opposite sides thereof. The piston rods 16 of the said pistons are connected at their outer ends to each end of the bottom plate 14 and act to raise or lower the said plate which in turn causes the heating plates 5, which are linked to one another, to be moved closer together or further apart thereby to increase or decrease the intervening spaces 6 between the said plates and impart greater or lesser mechanical pressure to the trays of foodstuffs inserted within the said spaces.

Referring now to FIGURE 2, there is shown therein part of a tray 17 which has been loaded with foodstuffs 18 such pre-frozen raw meat or fish cut into slices of a substantially uniform thickness, and which has been inserted into one of the spaces 6 between a pair of the hollow heating plates 5 shown in FIGURE 1, so as to rest upon the lower of the said pair of plates. Disposed in the bottom of the tray 17 so as to be positioned between the latter and the underside of the foodstuffs 18 is a layer or sheet of expanded metal 19 which extends over substantially the whole of the said tray and is in contact, on its upper face with the said foodstuffs. A second metal layer or sheet of expanded metal 20 similar to the first, is positioned on and in contact with the upper face of the foodstuffs, between the latter and a removable tray lid 21 which is in contact with the underside of the upper of the pair of heating plates 5.

The upper and lower layers or sheets 19 and 20 are preferably of expanded metal having an open diamond shaped mesh, the configuration and dimensions of which make the said sheets suitable for use in the present method of drying and more especially when such method is to be used for accelerated freeze-drying, since layers or sheets of this type, in the course of their manufacture, tend to develop on one side thereof, at the corners of the meshes, slight points or peaks 22 whilst on the opposite side of the layers or sheets, the said corners are rounded. These points or peaks 22 form a series of rows of ridges throughout the meshwork which ridges provide between them a series of clear paths 23 from any point in a sheet to the outer edges thereof. In use, that side of a sheet 19 or 20 on which the corners of the meshes are pointed is preferably placed against the foodstuffs, whilst the opposite side of the said sheet, on which the corners of the meshes are rounded, is in contact either with the bottom of the tray and through the latter with the lower heating plate 5, or with the tray lid 21 and through the latter, with the upper heating plate 5.

This arrangement enables the heating plates 5 to be closed tightly on to the foodstuffs 18 without causing "stifling." Continuous plate pressure can be applied so that the points 22 of the expanded metal sheets may actually indent the dried surface layers of the foodstuffs to some extent. This ensures an adequate rate of heat transfer while the open mesh presents a comparatively low impedance to vapour flow. For ease of handling and to prevent possible contamination of the foodstuffs, the expanded metal sheets are preferably used in conjunction with trays and lids, but the said trays and lids could be dispensed with if desired. Suitable materials for the expanded metal sheets would be aluminium, stainless steel, or other stable metals, which are non-injurious to foodstuffs, readily cleaned and conducive to plant hygiene.

During freeze drying, sublimation from the ice surface in the foodstuffs occurs at a rate which depends on the rate at which heat is supplied to it, and on the impedance to the flow of vapour from it. As drying proceeds, the ice surface recedes into the interior so that a layer of dry foodstuffs of increasing thickness intervenes between it and the heating surface. The thermal conductivity of this dry layer is low so that the transfer of heat through it to the ice surface becomes more difficult as the layer thickens. At the same time the impedance to the flow of vapour from the ice surface through the porous dry layer to the outside, becomes greater. It is evident that a high rate of drying can be achieved by applying the maximum permissible heat to the foodstuffs when the impedances to both heat and vapor flows are small, i.e., at the start of drying and while the dry layer is thin. By the provision of the expanded metal sheets 19 and 20, or similar open mesh layers of metal according to the invention, it is possible to obtain this high rate of drying, since the risk of "stifling" and thawing is negligible. This high rate of drying may be prolonged by advancing the expanded metal sheets into the dry layers of the foodstuffs by the application, to an increasing extent of the mechanical pressure already referred to.

The preparation procedure prior to dehydration varies with different foodstuffs depending on the form in which the product is required, and the actual methods adopted are dictated by the economy and efficiency of drying, and whether it is intended to treat a foodstuff which may be eaten without subsequent cooking.

Although drying is generally more economical if the surface to volume ratio is large, the method according to the invention finds particular application when the foodstuff is required as flat slabs or slices of appreciable thickness. It is difficult to slice meat and fish evenly in the fresh raw state, and there may be considerable loss in exudate. Such foodstuffs therefore may be frozen whole and subsequently sawn, guillotined or otherwise cut into slabs of regular thickness. It is possible in certain cases to shell-freeze the outer layers so that the foodstuffs may be sliced with a mechanically operated knife, as in a bacon-slicer machine, and then frozen completely in slice form.

In the case of prepared dishes consisting of a number of ingredients which are cooked prior to dehydration, the mixture may be frozen in a mould, cut in the manner mentioned above, and subsequently loaded into the drying chamber.

Sliced raw foodstuffs may be frozen right through very speedily by placing the slices in a vacuum chamber, which can be the same chamber in which the slices are to be dried, and reducing the absolute pressure to below about 4½ mm. of mercury, so that the moisture contained in the slices will commence to evaporate rapidly and the latent heat of evaporation extracted from the foodstuffs will reduce the latter's internal temperature below the freezing point.

It has been found that with certain foodstuffs such surface drying from the liquid phase causes a migration of salts which with other solids from cut cells tend to form a pellicle or horny skin which can form a barrier to the escape of vapour in subsequent freeze-drying. This impedance can be overcome by the provision of layers of open mesh or network form such as expanded metal or expanded plastic sheeting which are positioned adjacent to the upper and lower surfaces of the foodstuffs in the manner shown in FIGURE 3, so that parts of said surfaces are covered and parts exposed by the mesh. As will be seen from this figure the layers 24 and 25 of expanded metal or expanded plastic sheeting are arranged in a similar manner to the expanded metal sheets 19 and 20 shown in FIGURE 2 in relation to the foodstuffs 26, that is to say the said layers are disposed respectively between the underside of the foodstuffs and the bottom of the tray 27 and between the upper side of said foodstuffs and the tray lid 28. Each tray 27 rests upon a support 29 which, in the case where the evaporative freezing is carried out in the same chamber as that in which the subsequent drying of the foodstuffs takes place, could be the heating plates 5 which during this phase would remain unheated. The layers 24 and 25 of expanded metal or expanded plastic sheeting are in point contact with the foodstuffs in the manner already described so that the mesh of said layers alternately covers and exposes portions 30 and 31 respectively over the whole of the surfaces of the foodstuffs, and provides channels 32 for the escape of vapour.

After this freezing operation the parts 30 of the foodstuffs which were covered by the mesh of the layers 24 and 25 are free from pellicle and the glazed surface on the remaining or exposed parts 31 is deeply fissured and does not inhibit subsequent drying or rehydration. This freezing is achieved by evaporating approximately 10% of the moisture present in the foodstuffs and consequently the evaporative load on the dehydration chamber is reduced by this amount when freeze-drying commences. If the foodstuffs are dipped in water prior to evaporative freezing the pellicle formation is less pronounced.

Since heat supply from the surroundings will delay the evaporative freezing, it is evident that expanded plastic sheeting will reduce such heat flow, and if the invention is to be applied to freezing without subsequent drying, the use of such a non-conducting material is preferred. Also an expanded mesh which has a wide strand width in relation to mesh aperture will further reduce pellicle formation. For example, a type of mesh having a strand area to aperture area ratio of 2:1 has been found most satisfactory. A plastic mesh would require to be replaced by a metal mesh before drying was continued after freezing, but if a metal mesh were used for freezing, this could be retained for drying without interruption of the process.

The drying procedure when using expanded or similar open-mesh layers or sheets is as follows:

When the necessary vacuum is established and the partial pressure of water vapour within the chamber 1 has been reduced below that corresponding to the triple point of the aqueous solutions in the foodstuffs 18, the heating plates 5 are moved closer together so that the points 22 of the expanded metal sheets 20 and 21 are in definite but light contact with the foodstuffs. The heating fluid temperature of the plates 5 is then raised from about 15° C. to 140° C. or as high as possible, in approximately 10 minutes or less, while the plate pressure is correspondingly increased over a period of 20 minutes to a maximum which may be of the order of 7½ lb. per sq. in. of foodstuff surface. This increase of pressure and temperature should be comparatively gradual to ensure that the receding ice layer is always in advance of the points 22 of the expanded metal sheets 19 and 20. During this period the maximum rate of evaporation is achieved and the heating fluid temperature is maintained at a peak level for 1 to 1½ hours. After this period the internal resistance to vapour flow increases so that the cooling effect caused by the escape of the reduced quantity of water vapour is insufficient to maintain the surface temperature at a safe value (below 60° C.). Consequently, the temperature of the heating fluid must be slowly reduced to this value to obviate heat damage. As the plate pressure is maintained the points 22 of each of the expanded metal sheets 19 and 20 indent the dry layer of the foodstuffs 18 to a depth of about 1 mm., and drying is completed when evaporation ceases, thereby permitting the internal temperature of the foodstuffs to approach that of the heating surfaces. With one form of expanded metal the indentations, produced by the penetration of the mesh, cover about 20% of the total area of the flat foodstuff surfaces. The average temperature of the ice in the foodstuffs during drying is approximately —10° C., the total absolute pressure averages about 1 mm. of mercury and under these conditions a maximum rate of evaporation of about 1 lb./hr./sq. ft. of tray area may be achieved.

By the use of expanded sheets or similar metal layers of open-mesh form according to the invention, the drying time is thus considerably shortened due mainly to the elimination of the period of restricted heat input. Also, since increasing plate pressure is applied during the process, the penetration of the points of the expanded metal into the foodstuffs helps to even out irregular drying which might otherwise be caused by small differences in the thicknesses of the slices of foodstuffs such as meat and fish. Thawing during the initial stages of the drying period when a vacuum is being created in the chamber, is less likely to occur because of the much reduced area of contact when expanded metal or similar open mesh metal layers are used between the foodstuffs and the flat trays. Even if slight thawing does occur at this stage, it will be localised at the points of the expanded metal and will not cause subsequent "stifling." Because of the absence of thawing, the foodstuffs do not stick to the expanded metal or similar open mesh sheets, and the resultant absence of exudate makes cleaning of the sheets an easy matter.

Subsequent to drying, and to ensure an adequate storage life, the product must be transferred to suitable oxygen- and moisture-proof containers without prolonged intimate exposure to atmospheric air. The vacuum in the chamber should therefore be released by flooding the chamber with a dry inert gas such as nitrogen. It is an added advantage of the expanded metal sheet that it readily permits the dry gas to penetrate to the centre of porous tissue where it is adsorbed, thus protecting the tissues during subsequent unavoidable handling in the atmosphere where the ingress of oxygen would be otherwise possible and would be difficult to remove completely by subsequent gas packing and would cause oxidative deterioration.

According to another example of carrying out the invention, the provision of separate hollow labyrinthed heating plates 5 through which a heating medium is caused to flow, may be dispensed with, and the layers of expanded metal, or of similar open mesh or other network form, themselves constitute electric heating elements. Such an arrangement is shown in FIGURE 4, according to which the said layers may each comprise a number of strips 33 of expanded metal or the like secured to one or both sides of a sheet 34 of insulating material in spaced parallel relationship and connected electrically in series by bridge members 35. The said strips 33 may either be of a length such as to extend individually over the whole width of the insulating sheet 34 in a single bank, or as shown in FIGURE 4 they may be of approximately half the width of the said sheet and arranged in two banks. The first and last strips of a bank of strips are connected at terminals 36 to a source of electricity, and each strip has a cross-sectional conductive area which is within such limits as will bring the low voltage, high current system contemplated, within practical bounds.

With this modified arrangement, as shown in FIGURE 5, the trays and lids can also be dispensed with, the insulating sheets, which together with their attached heater elements constitute the supports for the foodstuffs, being capable of assembly for drying, in the form of a multi-deck sandwich positioned between a pair of end pressure plates as before. Such plates would be electrically insulated from the uppermost and the lowermost of the bank of heater elements in order to prevent short circuiting. In order to reduce as much as possible the initial maximum electrical load when heating a bank of such sheets, the latter, instead of being simultaneously energised, can be so arranged as to be brought into operation successively. The electrical conductivity of ice is very low and the heater elements can be arranged so that when such elements are in contact with the frozen foodstuffs, adjacent portions of the elements will not have a large difference in potential. Such an arrangement is very compact, the ancillary equipment required much simpler, and it lends itself more readily to automatic control such as by cam-operated variable transformers.

It is to be understood that whilst the invention has been described with reference more particularly to the method of vacuum drying of foodstuffs from the frozen state, it can equally well be used with advantage, especially in the matter of reducing the drying period, in vacuum drying from the liquid phase, or any other process where it is required to put in heat and take out vapour (e.g., removal of solvents after fat extractions, etc.).

One advantage of the present invention is that the use of expanded metal inserts overcomes the main impedance to mass transfer from the foodstuffs which exists during contact heating so that there should be virtually no external resistance to vapour flow. Freeze-drying may then proceed unhampered by any consideration other than the temperature of the material surface, provided that the drying chamber is fitted with adequate pumping capacity. Another advantage is that heat may be supplied through the expanded metal at the optimum rate immediately evaporation commences at the start of drying when internal resistance is at the minimum. A further advantage is that evaporation occurs from the same side or sides as the heat is introduced and during this period of maximum evaporation rate, the cooling effect arising from the flow of the relatively cool water vapour through the dry tissue is also a maximum. Also that this period of high evaporation rate may be prolonged by pressing the expanded metal into the foodstuffs and thus partially overcoming the heat insulating effect of the dry surface layers. Further, the expanded metal, by nature of its shape, still offers an adequate vapour flow path and the contact pressure may be applied to an optimum degree immediately evaporation commences, because the frozen foodstuffs is sufficiently rigid to resist collapse.

The use of expanded metal sheets also has the advantage that it permits the freezing of substantial pieces of foodstuffs by evaporative cooling in a vacuum chamber, particularly if their use is accompanied by a water dip, without appreciably inhibiting subsequent freeze-drying.

Also the provision of open mesh sheets of the same general design as those used in vacuum drying but made of an insulating material such as plastic or synthetic resin, is advantageous for the application of the invention to a process of freezing by reduction of pressure, providing that the resulting surface desiccation is acceptable.

Further, the open mesh sheets may with advantage be made of a high electrical resistance material so as to permit their use as direct electrical heaters, thereby dispensing with the usual cumbrous and expensive heating plates.

Finally the method according to the invention provides an accelerated freeze-drying process suitable for application to foodstuffs which is substantially simplified, is more reliable and of shorter duration than the methods used hitherto, and consequently much more economical as regards production costs.

We claim:

1. Apparatus for preserving foodstuffs, comprising a vacuum chamber, plate elements of expanded metal mesh with the corners of said mesh forming peaks on at least one side of each of said plate elements, between which plate elements are supported the foodstuffs to be treated and which plate elements and foodstuffs are stacked one above the other in multi-sandwich form within the said chamber so as to be in direct contact, each of which plate elements is arranged to contact at least one layer of foodstuff along said one side, the said plate elements constituting electrical heating elements for transmitting heat to the foodstuffs and means for applying mechanical pressure to the said plate elements.

2. Apparatus for preserving foodstuffs comprising a vacuum chamber, plate elements of expanded metal mesh supported in and arranged one above another in said chamber the corners of said mesh forming peaks on one side of said plate elements, each of which plate elements is arranged to contact at least one layer of foodstuff along said one side, means for pressing said plate elements towards and into engagement with the foodstuff, and means for applying heat through said plate elements to at least one surface of each layer of foodstuff.

3. Apparatus for preserving foodstuffs, comprising a vacuum chamber and electrical heater elements consisting of plate elements of expanded metal mesh with the corners of said mesh forming peaks on at least one side thereof, said plate elements being arranged one above another and moveable vertically in said chamber, each of said plate elements being arranged to contact at least one layer of foodstuff along said one side and serving also to support one layer of foodstuff and to press upon the upper surface of another layer of foodstuff.

References Cited in the file of this patent

UNITED STATES PATENTS

| 1,009,881 | Allen | Nov. 28, 1911 |
| 1,309,357 | Falk et al. | July 8, 1919 |
| 1,768,296 | Rosenberg | June 24, 1930 |
| 2,284,913 | McComb | June 2, 1942 |
| 2,292,447 | Irwin | Aug. 11, 1942 |
| 2,332,886 | Basler | Oct. 26, 1943 |
| 2,586,474 | Moore | Feb. 19, 1952 |
| 2,602,825 | Flosdorf | July 8, 1952 |
| 2,930,139 | Brynke et al. | Mar. 29, 1960 |

FOREIGN PATENTS

| 651,265 | Great Britain | Mar. 14, 1951 |